United States Patent [19]

Arai

[11] Patent Number: 5,011,023
[45] Date of Patent: Apr. 30, 1991

[54] CONICAL ELEMENT FOR FILTERING AND SEPARATION

[75] Inventor: Koichi Arai, Kanagawa, Japan

[73] Assignee: Arai Machinery Corporation, Japan

[21] Appl. No.: 449,122

[22] Filed: Dec. 8, 1989

Related U.S. Application Data

[63] Continuation of Ser. No. 184,080, Apr. 20, 1988, abandoned.

[30] Foreign Application Priority Data

Apr. 21, 1987 [JP] Japan ................................. 62-096198

[51] Int. Cl.⁵ ............................................. B07B 1/46
[52] U.S. Cl. .................................... 209/400; 29/163.7; 209/395; 210/497.1
[58] Field of Search ............... 209/400, 395, 393, 392, 209/362, 359, 352, 405, 406, 274, 279, 281, 305; 210/497.1, 497.01, 497.3; 29/163.6, 163.7, 163.8

[56] References Cited

U.S. PATENT DOCUMENTS

| | | | |
|---|---|---|---|
| 1,644,121 | 10/1927 | Greene | 210/497.1 |
| 2,346,647 | 4/1944 | Bennison | 210/497.1 |
| 3,425,561 | 2/1969 | Steele et al. | 210/497.1 |
| 3,630,379 | 12/1971 | Shapples | 210/497.1 |
| 4,115,278 | 9/1978 | Fritsch | 210/497.1 |
| 4,569,763 | 2/1986 | Arai | 210/497.1 |

FOREIGN PATENT DOCUMENTS

| | | | |
|---|---|---|---|
| 450534 | 7/1936 | United Kingdom . | |
| 65189 | 11/1982 | Fed. Rep. of Germany | 210/497.2 |
| 584910 | 12/1977 | U.S.S.R. | 209/406 |

*Primary Examiner*—Donald T. Hajec
*Attorney, Agent, or Firm*—Dykema Gossett

[57] ABSTRACT

A conical element for filerting various substance and separating particles wherein a wire is wound in the form of a helix to form a helical slit between the adjoining peripheral margins of the wire thereby producing a linear treatment opening and increasing the area for filtering or separation to the utmost to improve the filtering or separation efficiency.

13 Claims, 2 Drawing Sheets

CONICAL ELEMENT FOR FILTERING AND SEPARATION

This is a continuation of copending U.S. application Ser. No. 07/184,080 filed on 4/20/88 abandoned.

BACKGROUND OF THE INVENTION

1. Field of the Invention

The present invention relates to a conical element for filtering various substances and separating particles.

2. Description of the Prior Art

Conventional, well-known conical elements of this type generally assume a structure provided with net-like or lattice-like filtering means.

There is also known a porous, conical element using ceramics for a coffee dripping apparatus.

The former structures provide filtering holes separated by solid areas, which results in relatively small filtering areas as compared to the total areas of filtering means, and leads to significant clogging. The smaller the particle size to be filtered, the greater the clogging problem.

On the other hand, with a porous structure impermeable foreign matter grows as a clog in the porous structure, resulting in unavoidable reduced filtering quantity. Accordingly, the foreign matter in the porous structure should be frequently removed completely.

SUMMARY OF THE INVENTION

The present invention is performed in view of the above problems. It is an object of the present invention to provide a conical element for filtering various substances and separating particles, wherein a wire is conically wound in the form of a helix to form a helical slit between the adjoining peripheral margins of the wire, thereby increasing the area for filtering or separation treatment as so-called linear treatment holes to the utmost to improve the filtering or separation efficiency.

Because of the conically shaped construction, which produces a sort of a funnel effect, the treating area for a liquid to be treated, such as a liquid or a gas, is increased. In addition, because the opening for filtering or separation is a helical slit, a so-called linear treatment hole is formed to improve the filtering.

The treating operation can smoothly be conducted because any residue, such as filtered waste, can be removed by simple operations such as back-wash or scraping.

DETAILED DESCRIPTION OF THE PREFERRED EMBODIMENT

Figure 1:
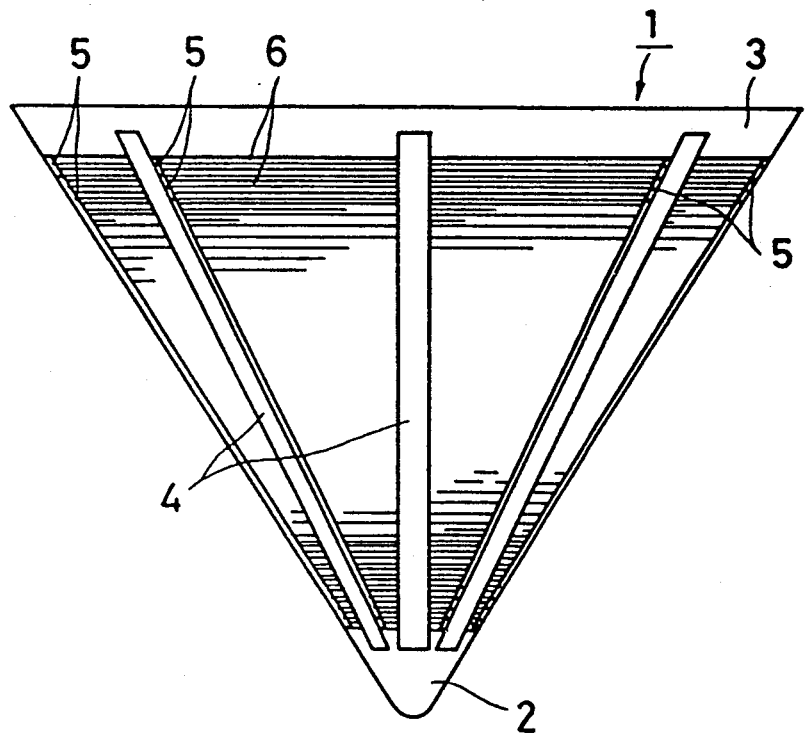
FIG. 1 is a side view showing one embodiment of the conical element for filtering and separation according to the present invention.

One embodiment of the present invention is described below with reference to the drawings.

A conical frame plate 1 of which the surface is generally conical is composed of a central member 2, an annular member 3 provided on the outer periphery of the flat frame 1, and a plural number of support frames 4 provided between both members 2 and 3. Helical discrete locking grooves 5 are cut precisely and at a definite pitch from the center of the flat frame plate 1 toward the outer periphery thereof. A wire 6 is helically wound within the locking grooves 5 while being engaged therewith. The ends of the wire 6 are in engagement with concave grooves 7 formed in the annular member 3 and the central member 2, respectively, and are secured in the grooves using a locking device 8 such as a machine screw.

The wire 6 has a cross-section of an equilateral triangle and the engaging grooves 5 are shaped in the form of a V in agreement with the form of the surface of the wire 6. The adjoining inwardly facing surface of the wound wire 6 forms a smooth conical curved surface P.

A helical slit or hole 9 of uniform interval is provided between the adjoining peripheral margins of the wire 6 which is helically wound. The precision of the slit holes is determined by the processing precision of the wire 6, the cutting precision of the engaging grooves 5 into the conical frame plate 1, and by the winding operation of the wire 6.

With the wire 6 having a cross-section of an equilateral triangle, as illustrated by the embodiment shown in the drawing, and precision forming, the slit can be of a size below 1 micron in width.

The wire 6 and the conical frame plate 1 may be formed not only of metals but also of other preferred materials such as plastics or ceramics.

Figure 2:
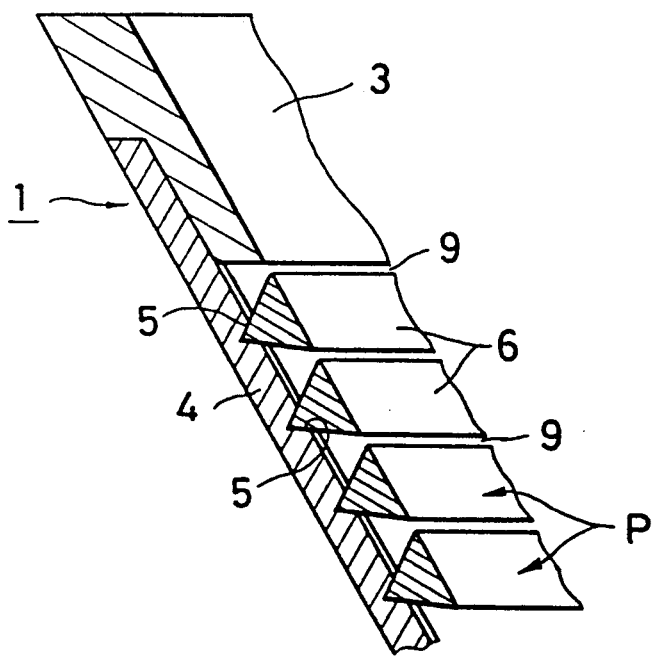
FIG. 2 is an enlarged fragmentary sectional elevational view of an outer peripheral protion of the above.
Figure 3:
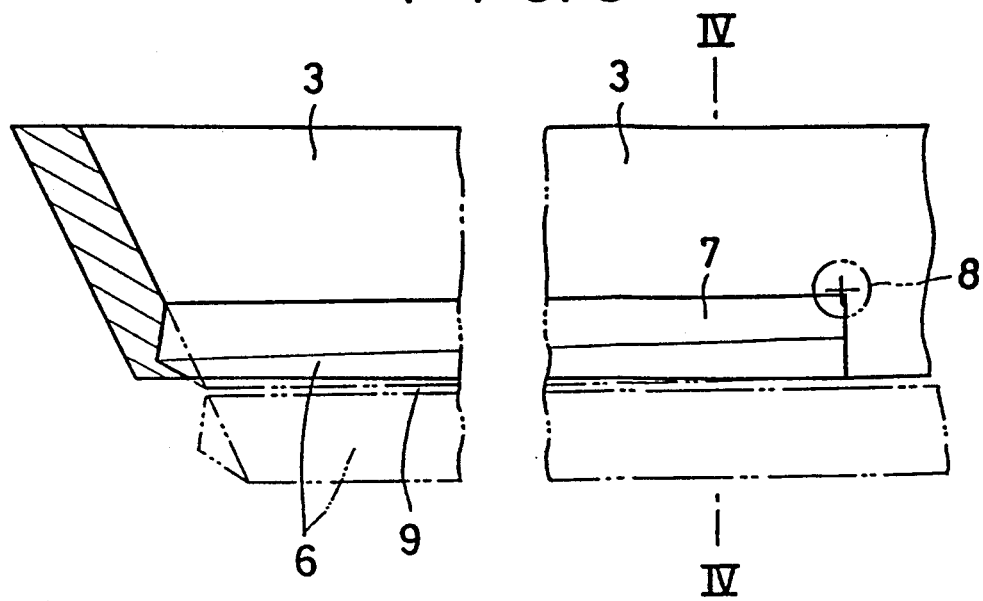
FIG. 3 is an enlarged fragmentary sectional elevation of an upper annular portion thereof.
Figure 4:
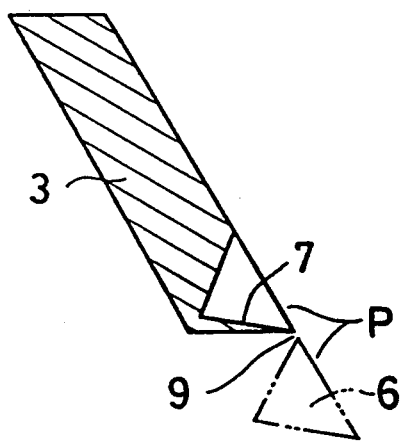
FIG. 4 is a cross-sectional view taken along the line IV—IV in FIG. 3.
Figure 5:
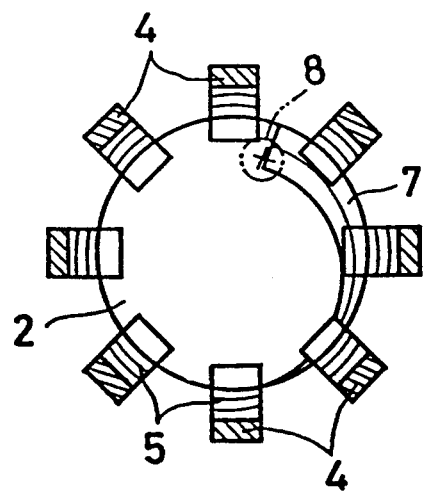
FIG. 5 is a fragmentary sectional plan view of a lower central portion thereof.

The smooth curved surface P of the helically wound wire 6 is directed to the primary side as illustrated in FIGS. 1 and 2, and in use the annular member 3 is fixed to a supply pipe on the outer periphery such that a desired fluid to be treated (a liquid or a gas) is allowed to pass toward the slit 9 in the direction of the arrow marks, i.e., from within the conical filter toward the exterior.

The residues, which are larger than the width of the slit 9 are removed from the fluid, particles smaller than the width of the slit 9 pass through. A filtering and separation of smaller from larger particles can also be accomplished, as well as a separation of solids from a fluid.

The residues which are filtered out and separated are piled up on the smooth curved surface P of the wire 6 but can easily be removed by reverse flushing. That is, by forcing fluid in the reverse direction from the exterior of the conical filter by means of back-washing. A scraper also can be used such that successive filtering and separation, and removal of residues, can be performed as is desired.

Although one embodiment of the present invention is described, it should be noted that the above conical frame plate 1 may comprise a flat plate on which a number of holes are provided, a lattice net plate, and a drainboard, all of which are processed in the form of a funnel, not shown, instead of the support frames 4, and the locking grooves 5 can be formed as grooves adapted to receive wire 6 having circular, or eliptical, or trapezoidal cross sections instead of the triangular form shown.

The wire 6 may be secured to frame plate 1 by means of a machine screw, or spot fusion, or an adhesive, in addition to fixation of both ends by means of the locking member 8, or instead of both end fixation.

According to the present invention, slit holes can be formed on the conical frame plate by means of the wire forming a smooth curved surface thereby markedly increasing the volume of treatment such as filtering and separation by so-called linear treatment holes. The slit holes themselves can be formed by the gap between the wire which is helically wound, such that the width can be determined precisely for enabling highly precise filtering and separation operations.

Because the filtering element is formed with an entirely smooth curved surface, it can be used with wide exchangeability as a permanent filtering and separation element for dripping coffee instead of various disposable filters.

What is claimed is:

1. A frustro-conical filter for filtering various substances and separating particles, said frustro-conical filter including, in combination:
   (a) a central member forming the apex of said filter and having at least a portion of a concave groove formed therein,
   (b) an annular member coaxial with said central member and having at least a portion of a concave groove formed therein,
   (c) a plurality of extending support frames connecting said central member and said annular member, and together forming a conically shaped frame,
   (d) discrete locking grooves provided in said extending support frames and arranged to extend in a helical fashion along the support frames from the central member to the annular member,
   (e) a wire of uniform cross section formed into a helix and extending from said concave groove in said annular member to said concave groove in said central member and engaging said locking grooves in said extending support frames, the interior of said wire forming a smooth conical curved surface,
   (f) a locking device on said central member to fix said wire into said concave groove in said central member, and
   (g) a locking device on said annular member to fix said wire into said concave groove in said annular member.

2. The invention as defined claim 1, wherein said locking grooves are v-shaped to conform with said wire which, in cross section is an equilateral triangle.

3. The invention defined in claim 2, wherein each of said extending support frames is provided with a plurality of spaced locking grooves, the space between said grooves determining the location of each turn of said wire and the axial distance between each of said helical wires, said spacing establishing the particle size to be filtered through said element.

4. A frustro-conical element for filtering and separation including a central member, an annular member coaxial with and spaced from said central member, a plurality of extending support frames connecting said central member and said annular member and together forming a conically shaped frame, and having discrete locking grooves therein and arranged to extend in a helical fashion along the support frames from the central member to the annular member, a wire engaging said grooves to regulate the size of particles to be filtered, the interior of said wire forming a smooth conical curved surface, said central member further includes a concave groove for securing a first end of said wire, said annular member further includes a concave groove for securing a second end of said wire, and a locking device for securing said wire in said concave groove in said central member.

5. The device defined in claim 4, and further including a locking device on said annular member for securing said wire in said concave groove in said annular member.

6. A frustro-conical element for filtration and separation including a central member, an annular member coaxial with and spaced from said central member, a plurality of extending support frames connecting said central member and said annular member and together forming a conically-shaped frame, and having discrete locking grooves therein and arranged to extend in a helical fashion along the support frame from the central member to the annular member, a wire extending between said central member and said annular member and engaging said grooves to regulate the size of particles to be filtered, the interior of said wire forming a smooth conical curved surface, wherein said wire is helically wound between said central portion and said annular portion, a first end of said wire is secured in said central portion, said helically wound wire is further locked into position by said locking grooves in said extending support frames, and a second end of said wire is secured in position in said annular portion.

7. The device defined in claim 6, wherein each of said support frames is provided with a plurality of spaced locking grooves, the space between said grooves determining the location of each turn of said helically wound wire and and the axial distance between each of said helical wires, said spacing establishing the particle size to be filtered through said element.

8. The invention as define din claim 7, wherein said wire has a cross section of an equalateral triangle.

9. The invention as defined in claim 7, wherein said locking grooves are v-shaped.

10. The device defined in claim 9, wherein said wire is formed of plastic.

11. The device defined in claim 10, wherein said wire is made of ceramic material.

12. The device defined in claim 9, wherein said central member, said annular member, and said frame supports are made of a plastic material.

13. The device defined in claim 10, wherein said frame plate, said annular member, and said central member are made of a ceramic material.

* * * * *